US012759117B2

(12) United States Patent
Wang

(10) Patent No.: US 12,759,117 B2
(45) Date of Patent: Oct. 13, 2026

(54) EXTENDED RATCHET WRENCH

(71) Applicant: MOBILETRON ELECTRONICS CO., LTD., Taichung City (TW)

(72) Inventor: Ying-Tang Wang, Taichung City (TW)

(73) Assignee: MOBILETRON ELECTRONICS CO., LTD., Taichung City (TW)

( * ) Notice: Subject to any disclaimer, the term of this patent is extended or adjusted under 35 U.S.C. 154(b) by 268 days.

(21) Appl. No.: 18/796,261

(22) Filed: Aug. 6, 2024

(65) Prior Publication Data

US 2025/0083286 A1 Mar. 13, 2025

(30) Foreign Application Priority Data

Sep. 7, 2023 (TW) ................................ 112209651

(51) Int. Cl.
*B25B 21/00* (2006.01)
*B25B 23/00* (2006.01)
*B25F 5/00* (2006.01)

(52) U.S. Cl.
CPC ........ *B25B 21/004* (2013.01); *B25B 23/0028* (2013.01); *B25F 5/001* (2013.01)

(58) Field of Classification Search
CPC ......... B25B 13/02; B25B 13/06; B25B 13/46; B25B 13/48; B25B 13/481; B25B 21/00; B25B 21/002; B25B 21/004; B25B 21/008; B25B 23/0007; B25B 23/0021; B25B 23/0028; B25B 23/0042; B25B 23/02; B25B 23/14; B25B 23/147; B25B 23/16; B25B 27/0014; B25F 5/001; B25F 5/02
See application file for complete search history.

(56) References Cited

U.S. PATENT DOCUMENTS 11,453,105 B2 * 9/2022 Silha ..................... B25B 23/147
12,151,341 B2 * 11/2024 Chiang ................. B25B 21/004
2007/0234854 A1 * 10/2007 Collins ................. B25B 21/004 81/58.1
2010/0326243 A1 * 12/2010 Bouchard ............ B25B 21/004 81/57.44

* cited by examiner

*Primary Examiner* — Robert J Scruggs
(74) *Attorney, Agent, or Firm* — Apex Juris, pllc; R. Lynette Wylie

(57) ABSTRACT

An extended ratchet wrench includes a body, a tool head, and a fixing ring. The body has a head. The head has a first positioning surface, a first positioning structure, and an outer threaded portion that are concentric. The tool head has a rod body. The rod body has an engaging base and a support portion of a free end of the rod body is provided with a driven head assembly. The engaging base has a second positioning structure and a second positioning surface in contact with the first positioning surface. The first positioning structure matches with the second positioning structure in a convex-concave manner at any one of a plurality of angles with the axis as a rotation center. An inner side of the fixing ring has an inner threaded portion screwed with an outer threaded portion and a hooking surface hooking the engaging base in a second direction.

10 Claims, 9 Drawing Sheets

EXTENDED RATCHET WRENCH

BACKGROUND OF THE INVENTION

Technical Field

The present invention relates generally to an extended ratchet wrench, and more particularly to an extended ratchet wrench, wherein a tool head is detachable and an angle of the tool head relative to a body is adjustable.

Description of Related Art

Conventional extended ratchet wrenches include a manual ratchet wrench and an electric extended ratchet wrench. The electric extended ratchet wrench is equipped with a motor provided inside a body. The motor is sequentially connected to a reducing gear set, a drive shaft, and a driven head assembly mounted on a tool head. When the motor is activated, the motor drives the drive shaft to rotate through the reducing gear set, and the drive shaft drives the driven head assembly on the tool head to rotate unidirectionally. The driven head assembly has a working head, wherein a sleeve could be mounted on the working head. When the driven head assembly unidirectionally rotates along a rotation axis, the sleeve could fasten a bolt to an object or remove a bolt from an object.

The electric extended ratchet wrench could unidirectionally drive the sleeve to tighten or loosen the bolt on the object. However, the tool head disposed on the driven head assembly is fixed to the body to be non-rotatable or the tool head is detachably engaged with the body but a relative angle between the tool head and the body is not adjustable. As a result, when the extended ratchet wrench is applied to a bolt located at different angles and different positions, a user is required to change an angle of the wrist of the user to hold the extended ratchet wrench for orientating the sleeve toward the bolt, thereby causing inconvenience in usage and burdens to the wrist of the user which manipulates the extended ratchet wrench.

BRIEF SUMMARY OF THE INVENTION

In view of the above, the primary objective of the present invention is to provide an extended ratchet wrench, wherein a body and a tool head are detachably engaged with each other and a second positioning structure could match with a first positioning structure of the body in a convex-concave manner with any one of a plurality of angles, so that an angle of the tool head relative to the body is adjustable, thereby enhancing the convenience in use and reducing the burdens of rotating the wrist of the user.

The present invention provides an extended ratchet wrench including a body, a tool head, and a fixing ring. The body includes a casing body, a motor, a reducing gear set, and a first coupling member. The casing body has a head and a tail that are disposed in sequence along an axis. Two opposite directions along the axis are respectively defined as a first direction and a second direction. The head is located on a side of the tail facing the first direction. The head has a first axial hole. A side of the head facing the first direction has a first positioning surface, a first positioning structure, and an outer threaded portion that are concentric with the first axial hole. The motor, the reducing gear set, and the first coupling member are disposed in the casing body with the axis as a rotation center and are connected in sequence along the first direction. The first coupling member rotatably passes through the first axial hole.

The tool head includes a rod body, a driven head assembly, and a drive shaft. The rod body has an engaging base, a neck tube, and a support portion that are connected in sequence along the first direction. A second axial hole penetrates through the rod body along the axis. The engaging base is adjacently connected to the head of the body. A side of the engaging base facing the second direction has a second positioning surface and a second positioning structure that are concentric with the second axial hole. The second positioning surface is in contact with the first positioning surface. The second positioning structure matches with the first positioning structure in a convex-concave manner at any one of a plurality of angles with the axis as a rotation center. The driven head assembly is mounted on the support portion. The drive shaft passes through the second axial hole. One of two opposite ends of the drive shaft is engaged with the driven head assembly, and the other of the two opposite ends of the drive shaft has a second coupling member. The second coupling member is coupled to the first coupling member. The fixing ring fits around the rod body. An inner side of the fixing ring has a hooking surface and an inner threaded portion. The inner threaded portion is screwed with the outer threaded portion of the body. The hooking surface hooks the engaging base in the second direction.

When the fixing ring is detached from the outer threaded portion, the tool head could be detached from the body. The second positioning structure could match with the first positioning structure of the body in a convex-concave manner at any one of the plurality of angles with the axis as the rotation center. In this way, when the tool head is detached from the body, the angle of the tool head relative to the body is adjusted, and the second positioning structure of the tool head is engaged with the first positioning structure. Finally, the fixing ring is screwed with the outer threaded portion of the body to fix the tool head to the body. At that time, the angle of the tool head relative to the body is adjusted, so that when the user holds the body in the same way, the driven head assembly orientates toward the bolt, thereby enhancing the convenience in use and reducing the burden in rotating the wrist.

Preferably, a periphery of the casing body has a trigger opening. A trigger member is disposed on the trigger opening. The body further includes a control circuit. The control circuit is disposed in the casing body and is respectively and electrically connected to the motor and the trigger member. The control circuit is triggered by the trigger member to control an operation of the motor.

Preferably, the tail is detachably engaged with a battery module. The battery module is electrically connected to the control circuit.

Preferably, the driven head assembly is rotatable around a rotation axis and has a working head. The rotation axis is substantially perpendicular to the axis.

Preferably, the head has a base. The first axial hole penetrates through a center of the base along the axis. The first positioning structure includes at least one pin engaged with a surface of the base. The engaging base includes a tube portion and a large-diameter portion. The tube portion is closer to the body than the large-diameter portion and the large-diameter portion is farther from the body than the tube portion. The second positioning structure is formed on an end of the tube portion facing the second direction and comprises a plurality of positioning recesses arranged around the axis. The at least one pin is inserted into any one of the plurality of positioning recesses along the first direction.

Preferably, the surface of the base facing the first direction is connected to a protruding ring. The protruding ring and the first axial hole are concentric. The first positioning surface is formed on a surface of the protruding ring facing the first direction. An outer diameter of the large-diameter portion is greater than an outer diameter of the tube portion. The second positioning surface is formed between the tube portion and the large-diameter portion. The tube portion is inserted into an inner side of the protruding ring.

Preferably, the first positioning structure is formed on the surface of the base located between the first axial hole and the protruding ring. The first positioning structure includes at least one pin slot disposed on the surface of the base. The at least one pin is inserted into the at least one pin slot. A part of the at least one pin facing the first direction protrudes out of the surface of the base.

Preferably, the outer threaded portion is formed on an outer peripheral surface of the protruding ring. An outer peripheral surface of the large-diameter portion has an annular groove. A C-shaped retaining ring fits into the annular groove. The hooking surface of the fixing ring hooks the C-shaped retaining ring along the second direction.

Preferably, two crimped surfaces are respectively provided on two opposite sides of an outer peripheral surface of the fixing ring.

Preferably, the first coupling member has an insertion hole that is in a non-circular shape. The second coupling member matches with the shape of the insertion hole. The second coupling member fits into the insertion hole along the second direction.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
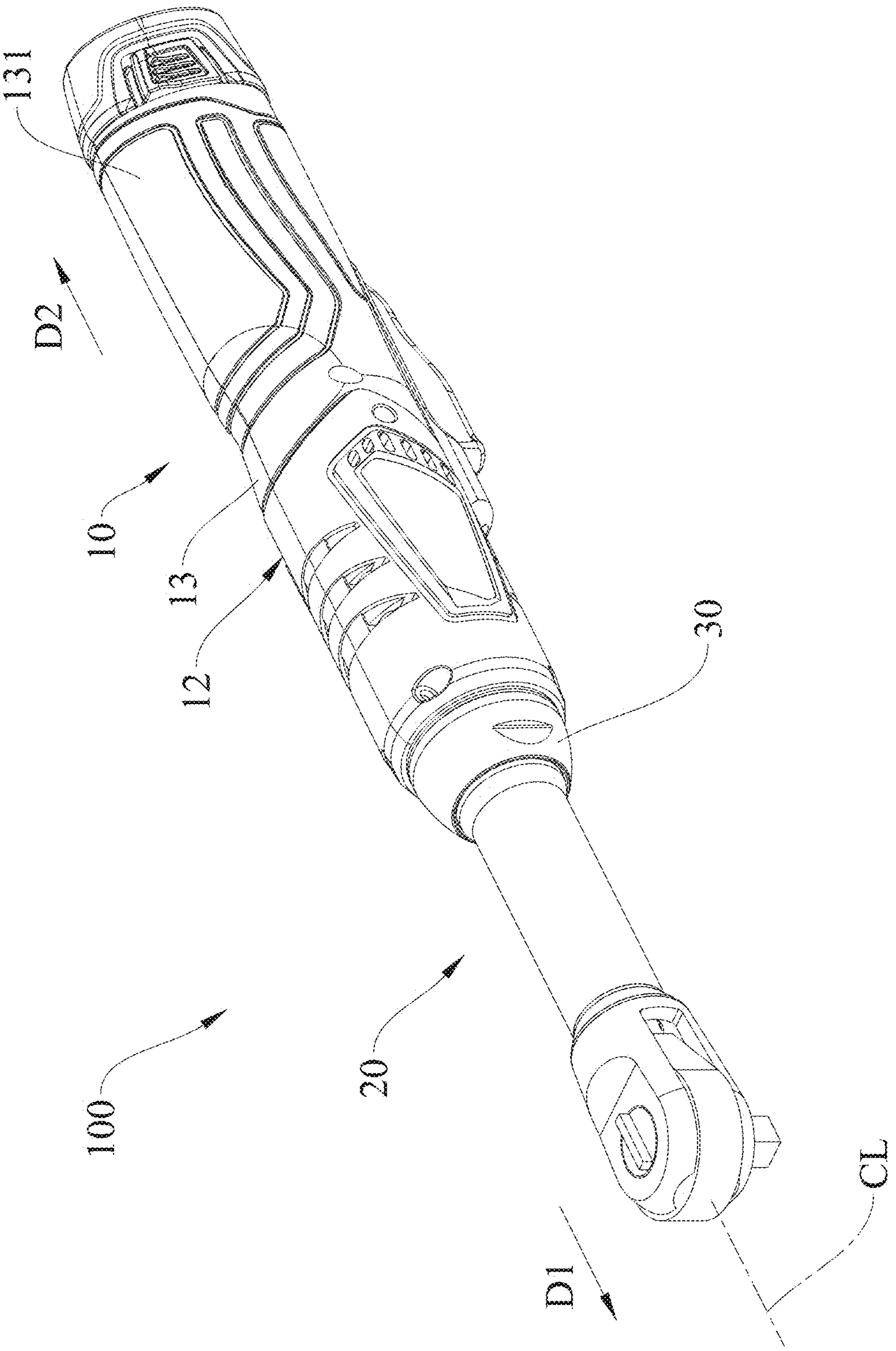
FIG. 1 is a perspective view of the extended ratchet wrench according to an embodiment of the present invention.
Figure 2:
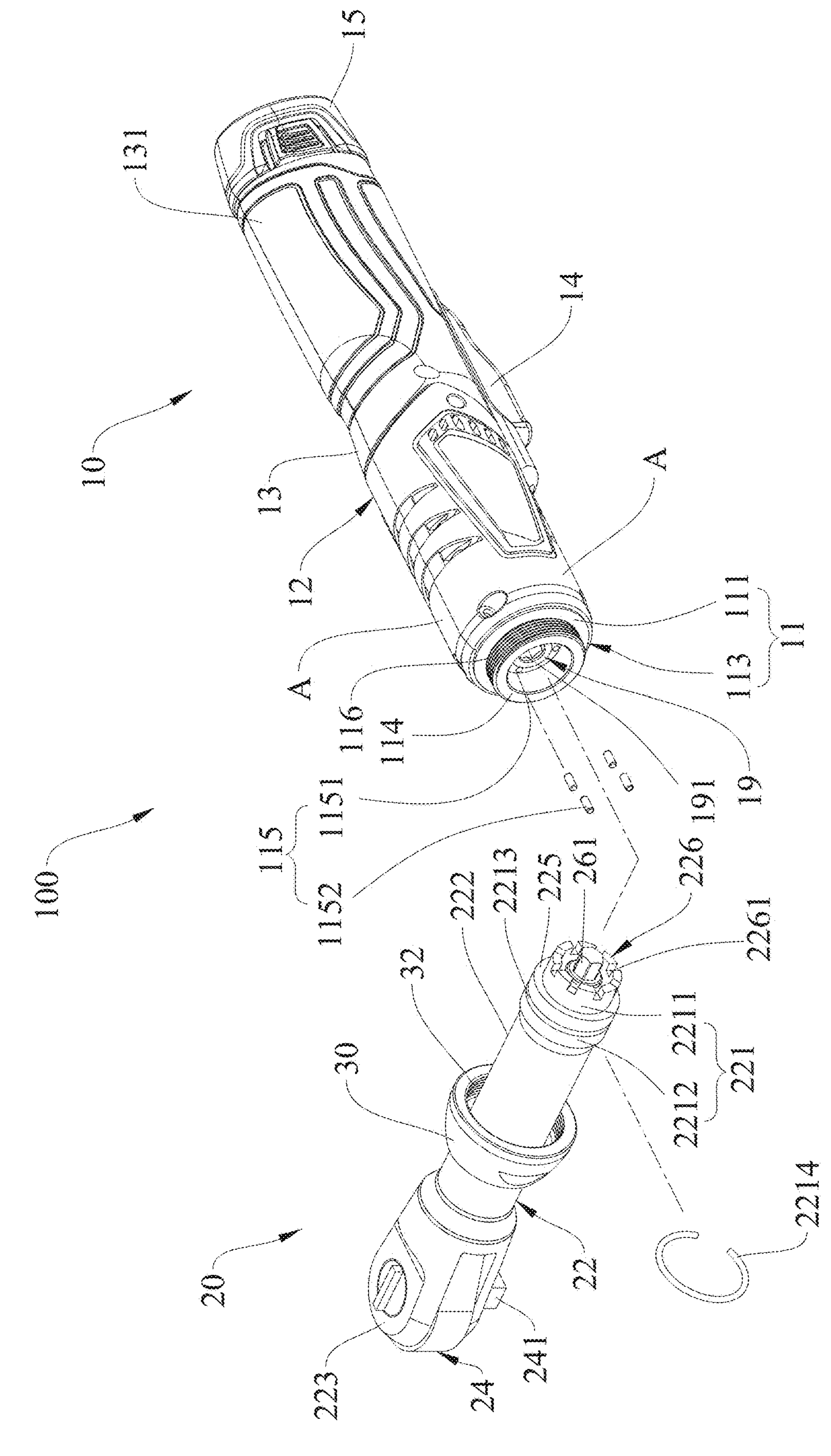
FIG. 2 is a perspective view, showing the tool head and the body are separated.
Figure 3:
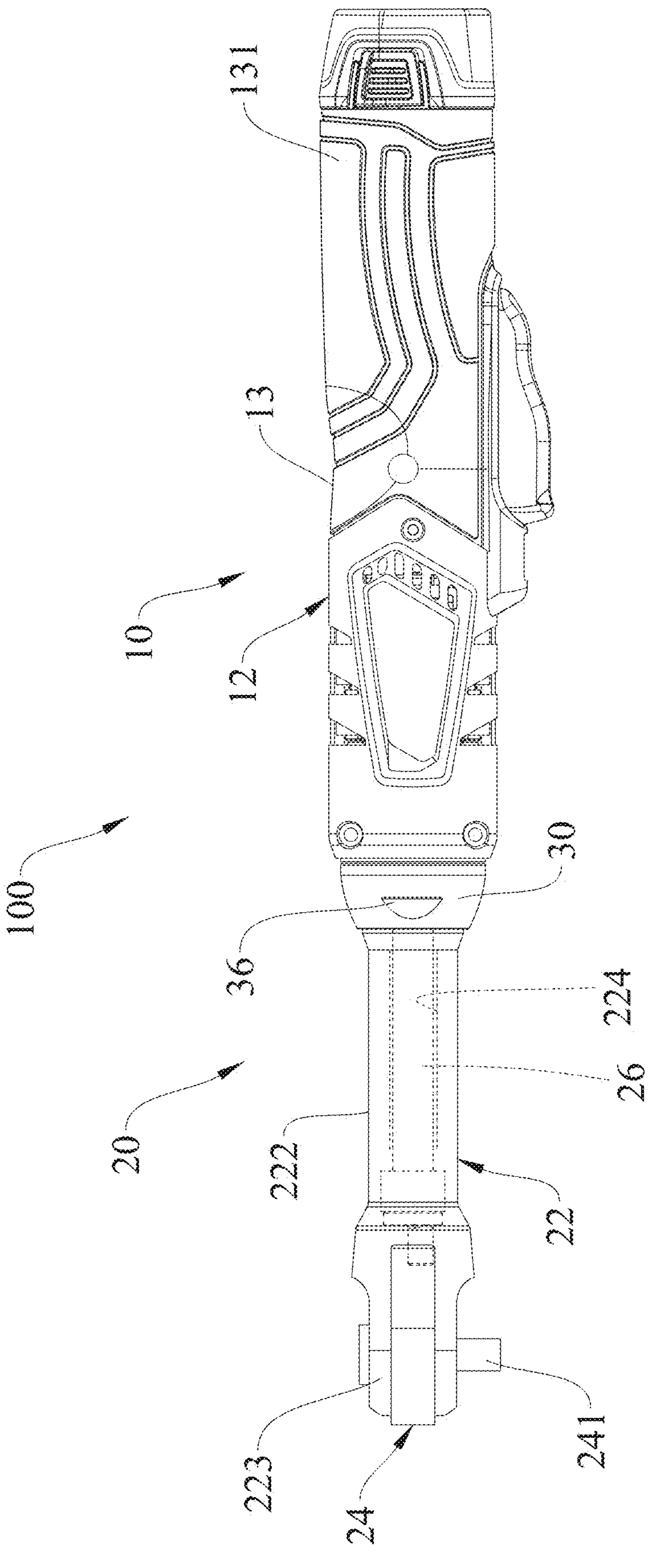
FIG. 3 is a right side view of the extended ratchet wrench according to an embodiment of the present invention.
Figure 4:
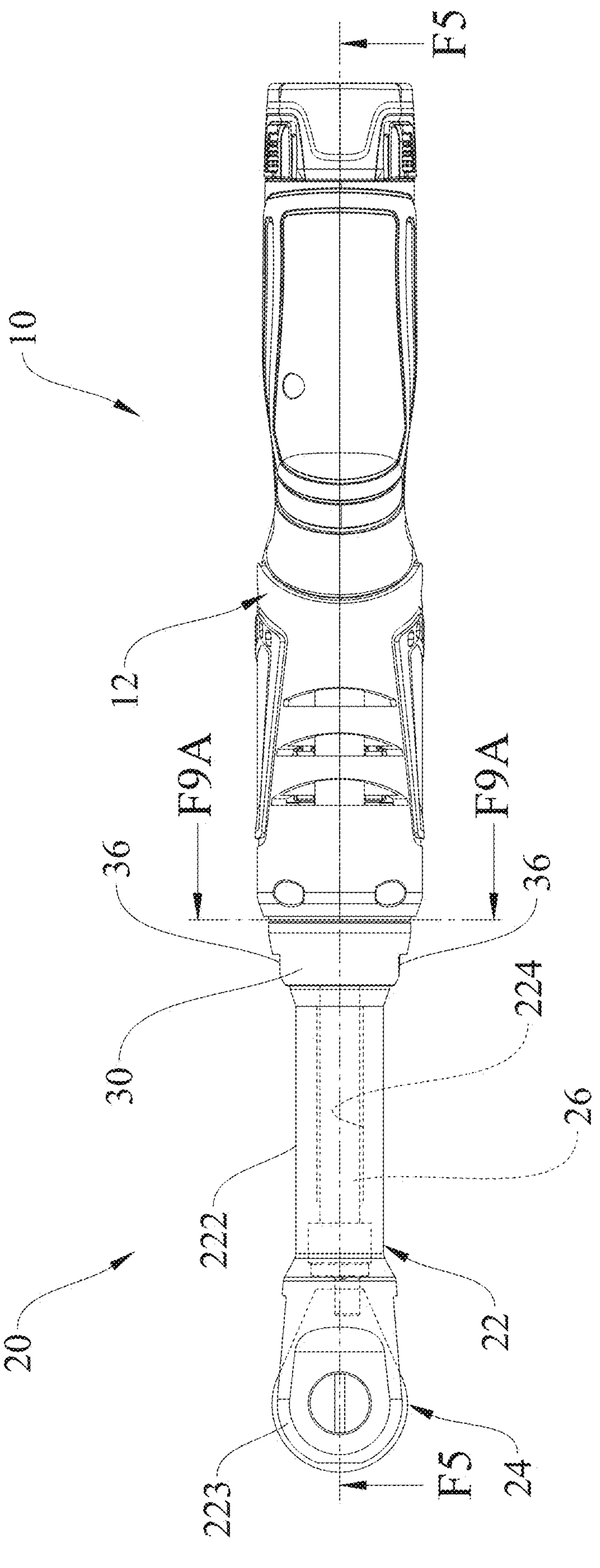
FIG. 4 is a top view of the extended ratchet wrench according to an embodiment of the present invention.

An extended ratchet wrench 100 according to an embodiment of the present invention is illustrated in FIG. 1 to FIG. 6 and is an electric ratchet wrench adapted to engage with a sleeve to fasten a bolt to an object or remove a bolt from an object. The extended ratchet wrench 100 includes a body 10, a tool head 20, and a fixing ring 30 detachably fixing the tool head 20 to the body 10, wherein an angle of the tool head 20 relative to the body 10 is adjustable.

The body 10 includes a casing body 12, a trigger member 14, a motor 16, a reducing gear set 18, a first coupling member 19, a control circuit 17, and a battery module 15. The casing body 12 has a head 11, a handle 13, and a tail 131 that are located in sequence along an axis CL. Two opposite directions in the axis CL are defined as a first direction D1 and a second direction D2. The tail 131 is formed on an end of the handle 13 facing the second direction D2. The head 11 is located on a side of the tail 131 facing the first direction D1.

Referring to FIG. 2 and FIG. 5 to FIG. 7, the head 11 has a base 111, wherein the base 111 is engaged with an end portion of the handle 13 facing the first direction D1. A first axial hole 112 penetrates through a center of the base 111 of the head 11 along the axis CL. The axis CL passes through a center of the first axial hole 112. A surface of the base 111 facing the first direction D1 is connected to a protruding ring 113 which is concentric with the first axial hole 112. A surface of the protruding ring 113 facing the first direction D1 has a first positioning surface 114, wherein the first positioning surface 114 is concentric with the first axial hole 112 and is in a circular-ring shape.

The surface of the base 111 that faces the first direction D1 is located between the first axial hole 112 and the protruding ring 113 has a first positioning structure 115. The first positioning structure 115 includes four pin slots 1151 and four pins 1152, wherein the pin slots 1151 are arranged on the surface of the base 111 at regular intervals around the axis CL, and each of the pins 1152 is inserted into each of the pin slots 1151. A part of each of the pins 1152 facing the first direction D1 protrudes out of the surface of the base 111. An outer threaded portion 116 is formed on an outer peripheral surface of the protruding ring 113. The outer threaded portion 116, the first positioning structure 115, and the first positioning surface 114 are concentric with the first axial hole 112 and are disposed on a side of the head 11 facing the first direction D1.

The handle 13 is formed by engaging two half casings A. The tail 131 is formed on an end portion of the handle 13 facing the second direction D2. A side of a periphery of the handle 13 has a trigger opening 132. The trigger member 14 passes through the trigger opening 132 and is fixed in the handle 13 of the casing body 12, wherein a part of the trigger member 14 passes out of the trigger opening 132. The motor 16, the reducing gear set 18, and the first coupling member 19 are disposed in the handle 13 of the casing body 12 with the axis CL as a rotation center. The motor 16, the reducing gear set 18, and the first coupling member 19 are connected in sequence along the first direction D1. The reducing gear set 18 is a planetary gear set. One of two opposite ends of the first coupling member 19 in the axis CL is engaged with the reducing gear set 18, and the other of the two opposite ends of the first coupling member 19 in the axis CL rotatably passes through the first axial hole 112 of the head 11. An end of the first coupling member 19 facing the first direction D1, i.e., the other end of the first coupling member 19 passing through the first axial hole 112 of the head 11, has an insertion hole 191. In the current embodiment, the insertion hole 191 is a hexagonal hole. However, in other embodiments, the insertion hole 191 could be provided in different shapes, such as star shape, rectangular shape, or other non-circular holes.

The control circuit 17 is disposed in the casing body 12. The control circuit 17 is respectively and electrically connected to the trigger member 14 and the motor 16, so that the control circuit 17 is triggered by the trigger member 14 to control an operation of the motor 16. The battery module 15 is detachably engaged with the tail 131 of the casing body 12. The battery module 15 is electrically connected to the control circuit 17 to power the trigger member 14, the motor 16, and the control circuit 17 of the body 10.

Referring to FIG. 2, FIG. 4 to FIG. 6, and FIG. 8, the tool head 20 includes a rod body 22, a driven head assembly 24, and a drive shaft 26. The rod body 22 has an engaging base 221, a neck tube 222, and a support portion 223 that are connected in sequence along the first direction D1. A second axial hole 224 penetrates through the rod body 22 along the axis CL. The second axial hole 224 penetrates through a center of the engaging base 221 and a center of the neck tube 222 to communicate with a space in the support portion 223. When the tool head 20 is engaged with the body 10, the engaging base 221 is adjacently connected to the head 11 of the body 10. The engaging base 221 includes a tube portion 2211 and a large-diameter portion 2212, wherein the tube portion 2211 is closer to the body 10 than the large-diameter portion 2212 and the large-diameter portion 2212 is farther from the body 10 than the tube portion 2211.

An outer diameter of the large-diameter portion 2212 is greater than an outer diameter of the tube portion 2211. An outer peripheral surface of the large-diameter portion 2212 has an annular groove 2213. A C-shaped retaining ring 2214 fits into the annular groove 2213. A second positioning surface 225 is formed between the tube portion 2211 and the large-diameter portion 2212, wherein the second positioning surface 225 faces the second direction D2 and is concentric with the second axial hole 224. The second positioning surface 225 is a circular-ring surface and is in contact with the first positioning surface 114.

Figure 5:
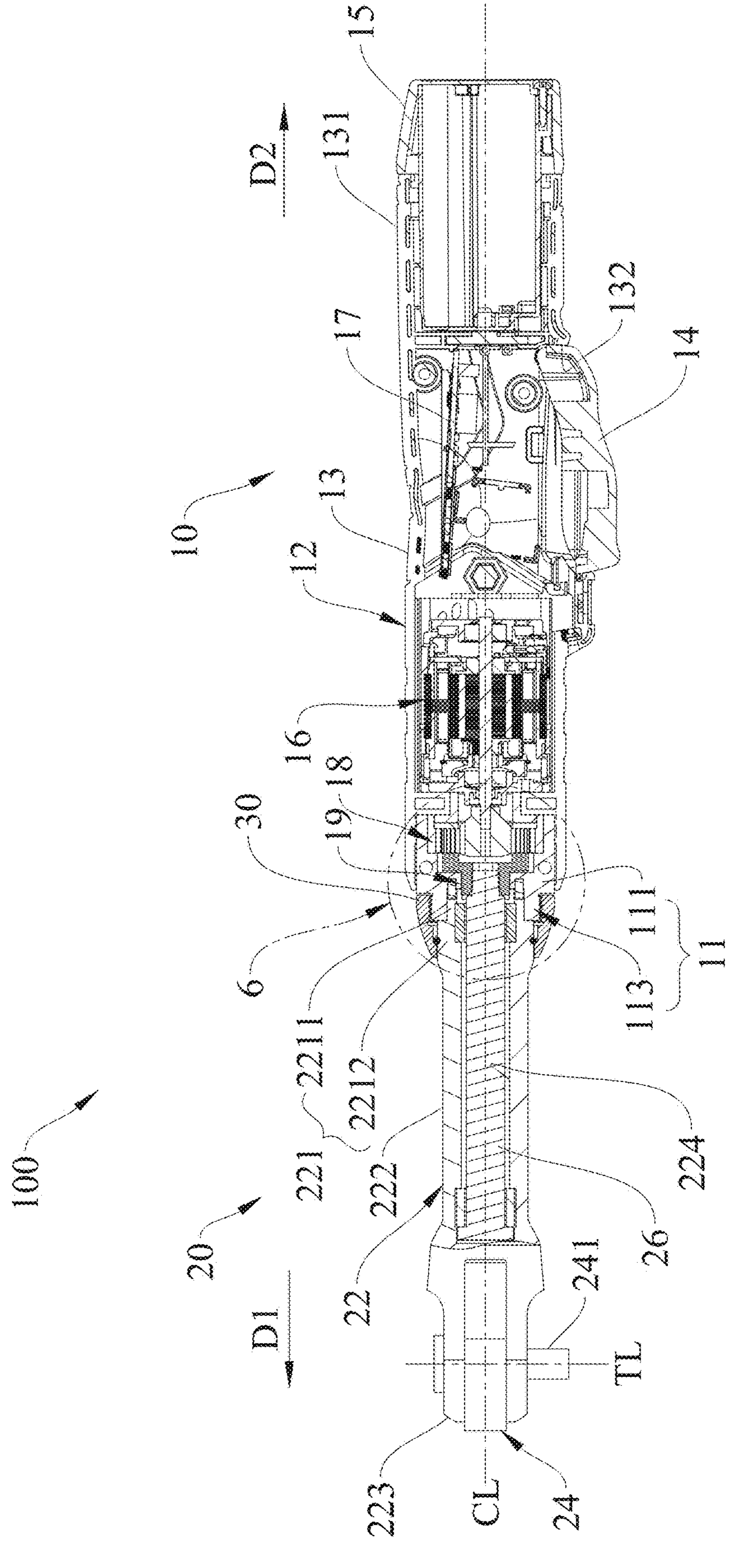
FIG. 5 is a sectional view along the F5-F5 line in FIG. 4.
Figure 6:
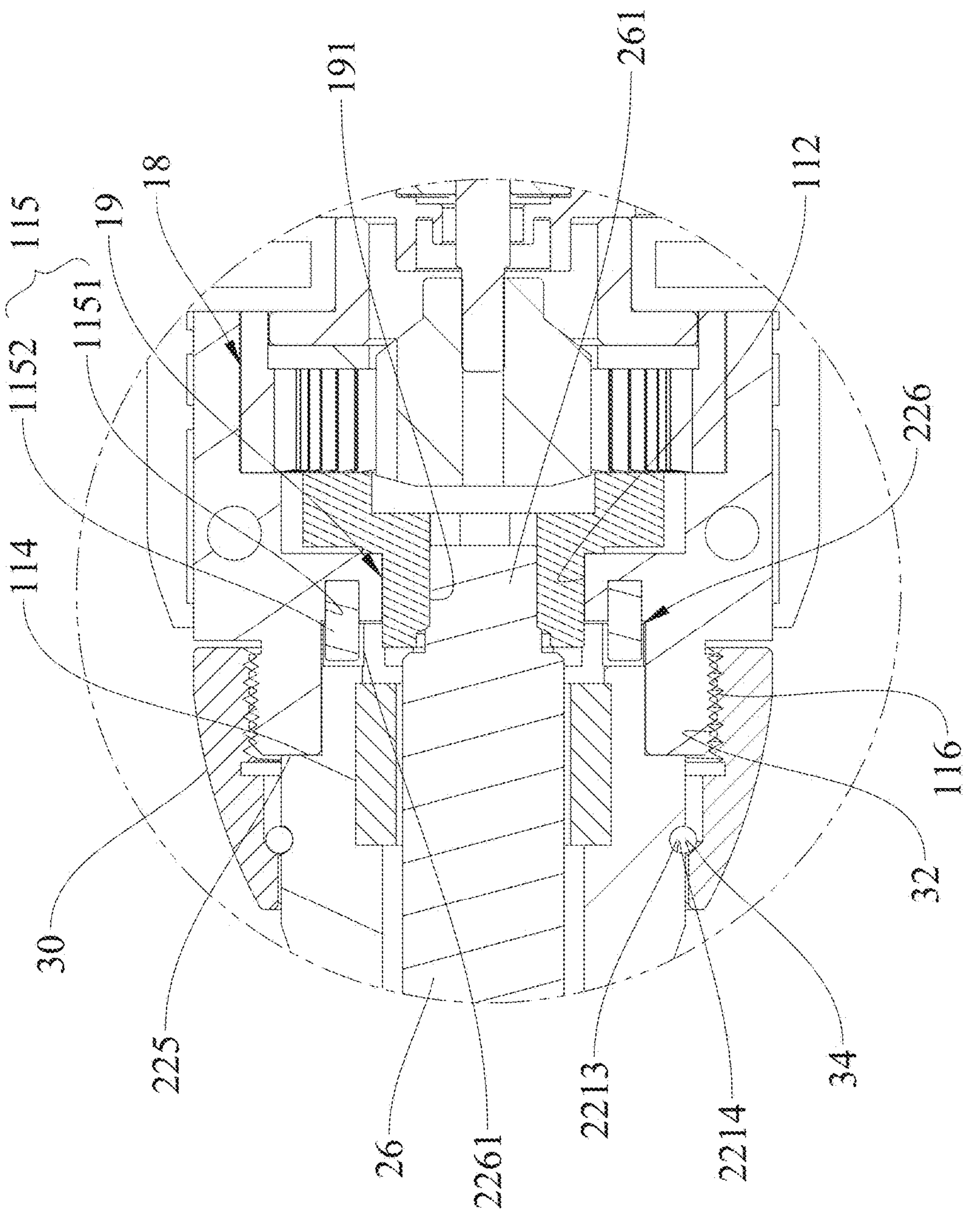
FIG. 6 is an enlarged view of a marked region 6 in FIG. 5.
Figure 7:
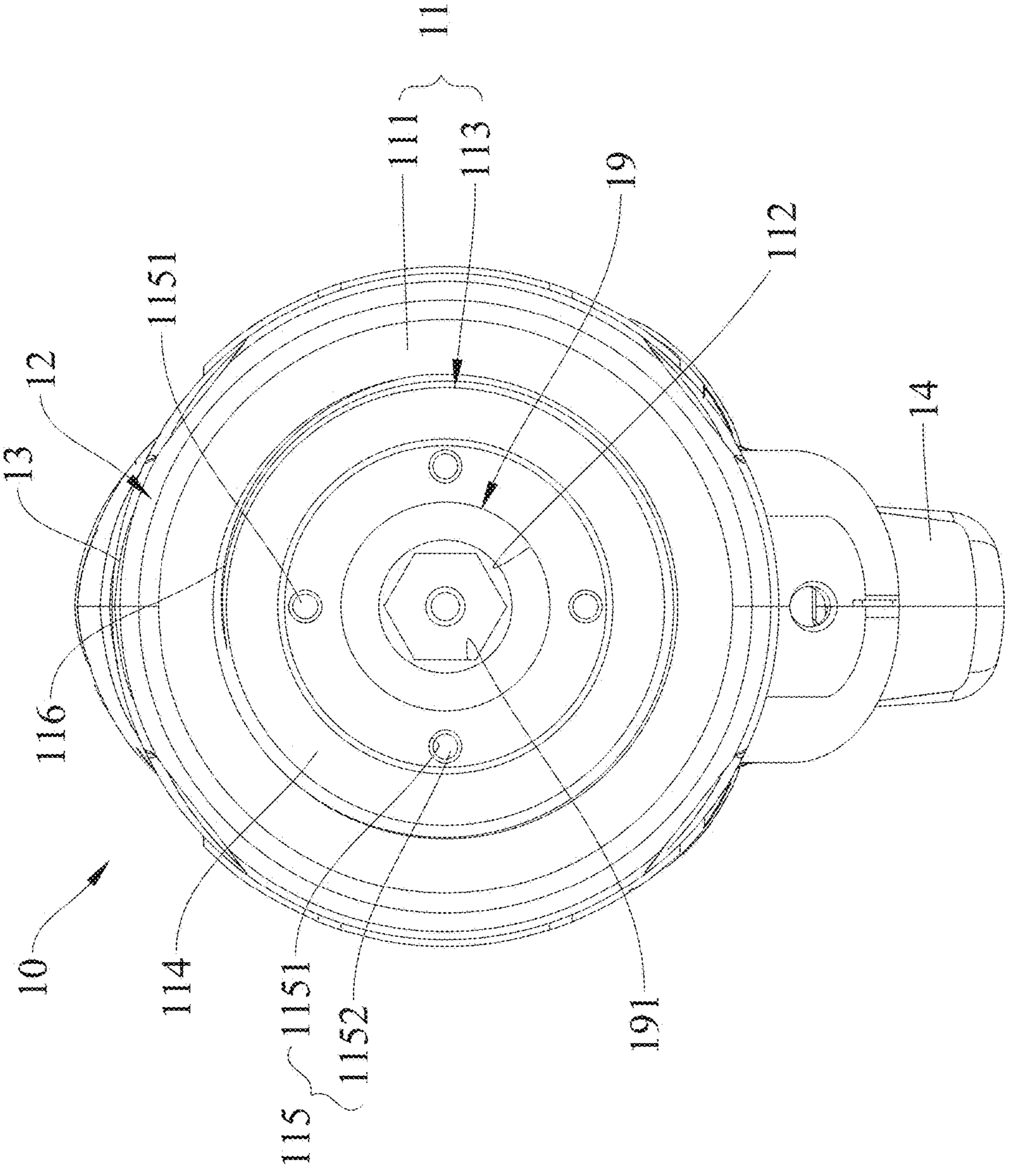
FIG. 7 is a front view of the body.
Figure 8:
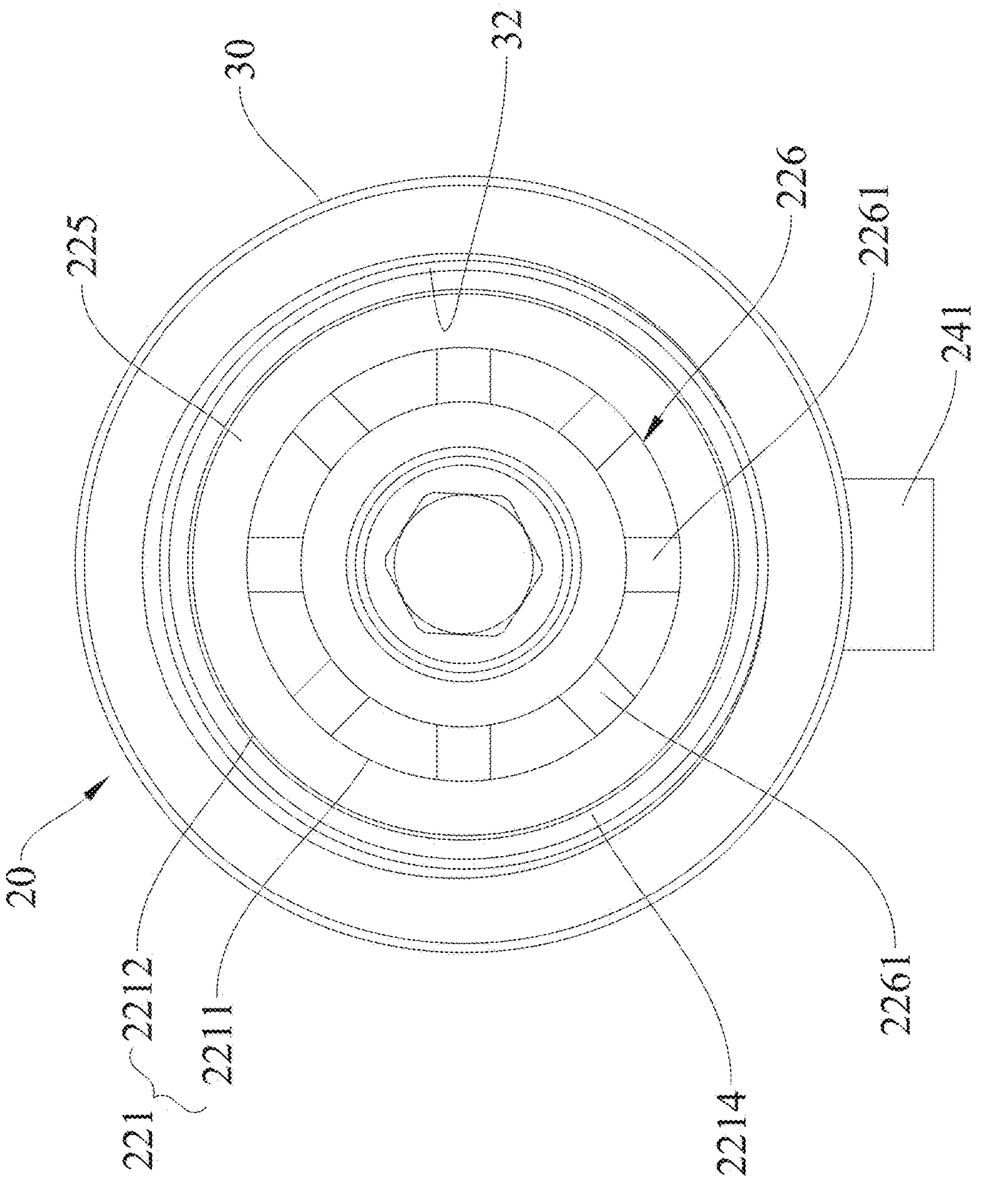
FIG. 8 is a rear view of the tool head.

The tube portion 2211 is inserted into an inner side of the protruding ring 113 of the head 11. An end of the tube portion 2211 facing the second direction D2 has a second positioning structure 226. The second positioning structure 226 and the second positioning surface 225 are disposed on a side of the engaging base 221 facing the second direction D2 and are concentric with the second axial hole 224. Referring to FIG. 5, FIG. 6, and FIG. 8A, the second positioning structure 226 includes eight positioning recesses 2261 arranged at regular intervals around the axis CL. Four of the eight positioning recesses 2261 are fitted in by four ends of the four pins 1152 facing the first direction D1, so that an angle of the tool head 20 relative to the body 10 with the axis CL as a rotation center could be fixed. In the current embodiment, the eight positioning recesses 2261 of the second positioning structure 226 are arranged at the regular intervals of 45 degrees around the axis CL, so that the eight positioning recesses 2261 of the second positioning structure 226 could match with the pins 1152 of the first positioning structure 115 in a convex-concave manner at any 45 degrees around the axis CL. In other embodiments, the number of the pin 1152 could be adjusted to one, two, three, or eight, as long as the pin(s) 1152 could be inserted into the positioning recesses 2261 and the first positioning structure 115 of the body 10 matches with the second positioning structure 226 of the tool head 20 after the tool head 20 is rotated to adjust the angle of the tool head 20 relative to the body 10.

The driven head assembly 24 is mounted on the support portion 223 of the rod body 22. The driven head assembly 24 is rotatable around a rotation axis TL and has a working head 241 adapted to engage with a sleeve. The rotation axis TL is substantially perpendicular to the axis CL. The drive shaft 26 passes through the second axial hole 224 of the rod body 22, wherein one of two opposite ends of the drive shaft 26 is engaged with the driven head assembly 24, and the other of the two opposite ends of the drive shaft 26 has a second coupling member 261. More specifically, the second coupling member 261 is a hexagonal rod matching with the shape of the insertion hole 191 and fits into the insertion hole 191 of the first coupling member 19 along the second direction D2. In the way, the second coupling member 261 and the first coupling member 19 are coupled; a rotation force of the motor 16 of the body 10 is reduced by the reducing gear set 18 and is outputted by the first coupling member 19 and then the rotation force is transmitted to the driven head assembly 24 through the second coupling member 261 and the drive shaft 26, thereby driving the driven head assembly 24 and the working head 241 of the driven head assembly 24 to rotate unidirectionally.

The fixing ring 30 is a circular ring and fits around the rod body 22. A part of an inner side of the fixing ring 30 adjacent to the body 10 has an inner threaded portion 32. A hooking surface 34 is provided around another part of the inner side of the fixing ring 30 away from the body 10. The fixing ring 30 is screwed with the outer threaded portion 116 of the head 11 of the body 10 through the inner threaded portion 32, and the hooking surface 34 hooks the C-shaped retaining ring 2214, which is located on the outermost side of the engaging base 221, along the second direction D2, so that the tool head 20 could not move along the first direction D1 and could not be detached from the body 10. Two crimped surfaces 36 are respectively provided on two opposite sides of an outer peripheral surface of the fixing ring 30. The two crimped surfaces 36 are parallel surfaces and are located on two opposite sides of the axis CL. The two crimped surfaces 36 are adapted to be crimped by a jaw of a wrench for rotating the fixing ring 30, so that the fixing ring 30 is fastened to the head 11 of the body 10 or the fixing ring 30 is loosened to detach from the head 11. In other embodiments, the outer peripheral surface of the fixing ring 30 could be provided with four crimped surfaces 36; alternatively, the outer peripheral surface of the fixing ring 30 could form a knurl to replace the crimped surfaces 36, thereby providing a friction for rotating the fixing ring 30.

Referring to FIG. 5 and FIG. 6, when the extended ratchet wrench 100 of the embodiment is used, a user holds the body 10 and presses the trigger member 14 of the body 10; the control circuit 17 is triggered to control the motor 16 to rotate the first coupling member 19 of the body 10 through the reducing gear set 18, so that the second coupling member 261 coupled to the first coupling member 19 drives the drive shaft 26 of the tool head 20 to rotate, thereby driving the driven head assembly 24 on the tool head 20 to rotate unidirectionally around the rotation axis TL. In this way, after the working head 241 of the driven head assembly 24 is engaged with the sleeve, the extended ratchet wrench 100 could be used to rotate the bolt for fastening the bolt to the object or loosening the bolt from the object.

Figure 9A:
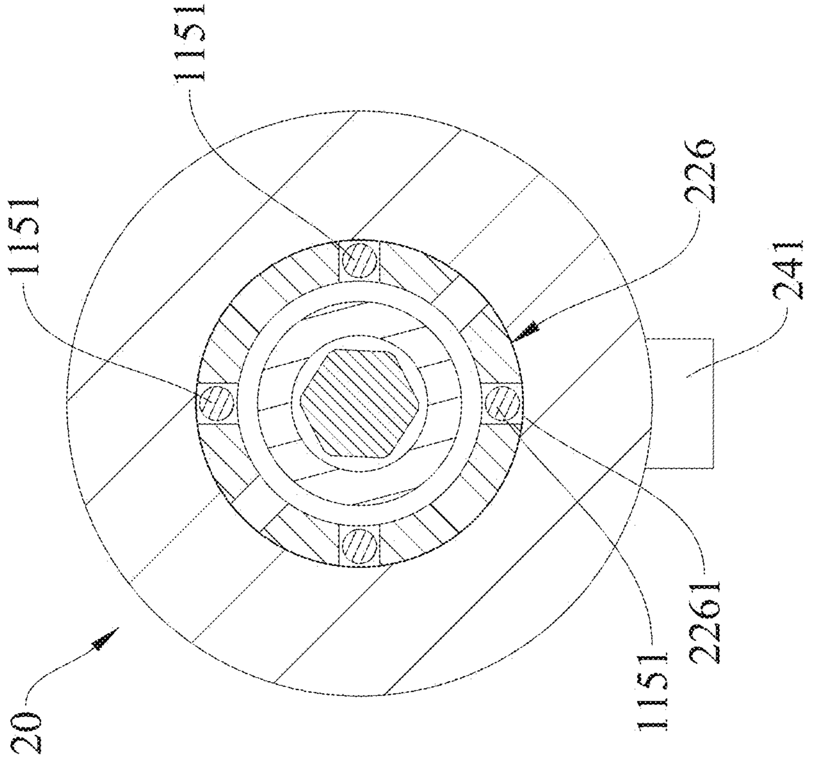
FIG. 9A is a sectional view along the F9A-F9A line in FIG. 4.
Figure 9B:
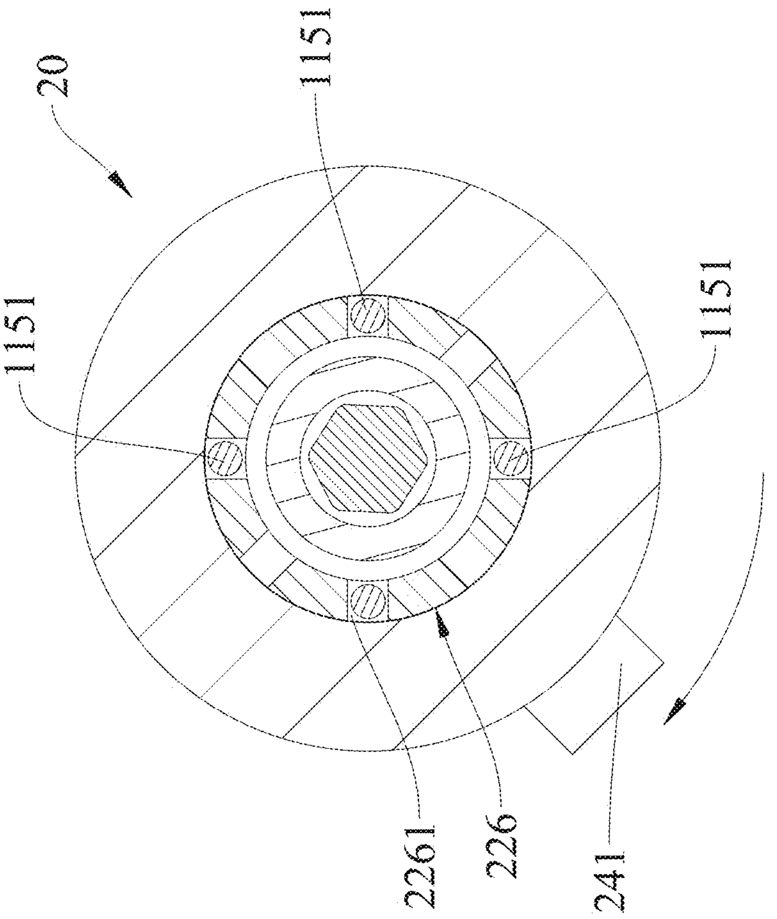
FIG. 9B is a schematic view, showing that the tool head in FIG. 9A is rotated by 45 degrees.

When the angle of the tool head 20 relative to the body 10 is required to be adjusted, the fixing ring 30 is rotated to disengage from a state of being fastened to the outer threaded portion 116; afterwards, the tool head 20 is moved along the first direction D1, so that the positioning recesses 2261 of the second positioning structure 226 are detached from the pins 1152 of the first positioning structure 115; the tool head 20 is rotated around the axis CL to adjust the angle of the tool head 20, so that the working head 241 faces a different direction; after the angle of the tool head 20 is selected, the tool head 20 is moved in the second direction D2 along the axis CL, so that the positioning recesses 2261 of the second positioning structure 226 facing the pins 1152 are inserted by the pins 1152 for positioning; at that time, the tool head 20 is not rotatable relative to the body 10. Referring to FIG. 9A and FIG. 9B, in the current embodiment, the tool head 20 is rotated by 45 degrees and the positioning recesses 2261 of the second positioning structure 226 facing the pins 1152 are inserted by the pins 1152 for positioning. Referring to FIG. 5 and FIG. 6, finally the fixing ring 30 is rotated to be screwed with the outer threaded portion 116, so that the tool head 20 is fixed to the head 11 of the body 10.

In the embodiment, the second positioning structure 226 of the tool head 20 includes eight positioning recesses 2261 that are arranged at the regular intervals around the axis CL. In other embodiments, the number of the positioning recesses 2261 of the second positioning structure 226 could be two or more, such as three, six, or other numbers. Moreover, the plurality of positioning recesses 2261 are not necessarily arranged at the regular intervals. For example, the second positioning structure 226 could include a plurality of positioning recesses 2261 arranged at irregular intervals and adapted to match with one pin 1152 of the first positioning structure 115 for positioning; the pin 1152 is selectively inserted into different positioning recess 2261, so that the second positioning structure 226 of the tool head 20 could match with the first positioning structure 115 at different angles with the axis CL as the rotation center, thereby fixing the angle of the tool head 20 relative to the body 10 after adjusting the angle of the tool head 20 relative to the body 10.

Additionally, in other embodiments, the position of the second positioning structure 226 and the position of the first positioning structure 115 are interchangeable. In this case, the tube portion 2211 is provided with the pins of the first positioning structure, and the surface of the base 111 forms the positioning recesses of the second positioning structure. In this way, the positioning recesses of the body could be inserted by the pins of the opposite tool head for positioning, and the first positioning structure and the second positioning structure could match with each other at different and multiple angles, so that the tool head and the body could match with each other to be fixed and positioned after the angle of the tool head relative to the body is adjusted.

It must be pointed out that the embodiments described above are only some preferred embodiments of the present invention. All equivalent structures which employ the concepts disclosed in this specification and the appended claims should fall within the scope of the present invention.

What is claimed is:

1. An extended ratchet wrench, comprising a body, a tool head, and a fixing ring;

wherein the body comprises a casing body, a motor, a reducing gear set, and a first coupling member; the casing body has a head and a tail that are disposed in sequence along an axis; two opposite directions along the axis are respectively defined as a first direction and a second direction; the head is located on a side of the tail facing the first direction; the head has a first axial hole; a side of the head facing the first direction has a first positioning surface, a first positioning structure, and an outer threaded portion that are concentric with the first axial hole; the motor, the reducing gear set, and the first coupling member are disposed in the casing body with the axis as a rotation center and are connected in sequence along the first direction; the first coupling member rotatably passes through the first axial hole;

wherein the tool head comprises a rod body, a driven head assembly, and a drive shaft; the rod body has an engaging base, a neck tube, and a support portion that are connected in sequence along the first direction; a second axial hole penetrates through the rod body along the axis; the engaging base is adjacently connected to the head of the body; a side of the engaging base facing the second direction has a second positioning surface and a second positioning structure that are concentric with the second axial hole; the second positioning surface is in contact with the first positioning surface; the second positioning structure matches with the first positioning structure in a convex-concave manner at any one of a plurality of angles with the axis as a rotation center; the driven head assembly is mounted on the support portion; the drive shaft passes through the second axial hole; one of two opposite ends of the drive shaft is engaged with the driven head assembly, and the other of the two opposite ends of the drive shaft has a second coupling member; the second coupling member is coupled to the first coupling member;

wherein the fixing ring fits around the rod body; an inner side of the fixing ring has a hooking surface and an inner threaded portion; the inner threaded portion is screwed with the outer threaded portion of the body; the hooking surface hooks the engaging base in the second direction.

2. The extended ratchet wrench as claimed in claim 1, wherein a periphery of the casing body has a trigger opening; a trigger member is disposed on the trigger opening; the body further comprises a control circuit; the control circuit is disposed in the casing body and is respectively and electrically connected to the motor and the trigger member; the control circuit is triggered by the trigger member to control an operation of the motor.

3. The extended ratchet wrench as claimed in claim 2, wherein the tail is detachably engaged with a battery module; the battery module is electrically connected to the control circuit.

4. The extended ratchet wrench as claimed in claim 1, wherein the driven head assembly is rotatable around a rotation axis and has a working head; the rotation axis is substantially perpendicular to the axis.

5. The extended ratchet wrench as claimed in claim 1, wherein the head has a base; the first axial hole penetrates through a center of the base along the axis; the first positioning structure comprises at least one pin engaged with a surface of the base; the engaging base comprises a tube portion and a large-diameter portion; the tube portion is closer to the body than the large-diameter portion and the large-diameter portion is farther from the body than the tube portion; the second positioning structure is formed on an end of the tube portion facing the second direction and comprises a plurality of positioning recesses arranged around the axis; the at least one pin is inserted into any one of the plurality of positioning recesses along the first direction.

6. The extended ratchet wrench as claimed in claim 5, wherein the surface of the base facing the first direction is connected to a protruding ring; the protruding ring and the first axial hole are concentric; the first positioning surface is formed on a surface of the protruding ring facing the first direction; an outer diameter of the large-diameter portion is greater than an outer diameter of the tube portion; the second positioning surface is formed between the tube portion and the large-diameter portion; the tube portion is inserted into an inner side of the protruding ring.

7. The extended ratchet wrench as claimed in claim 6, wherein the first positioning structure is formed on the surface of the base located between the first axial hole and the protruding ring; the first positioning structure comprises at least one pin slot disposed on the surface of the base; the at least one pin is inserted into the at least one pin slot; a part of the at least one pin facing the first direction protrudes out of the surface of the base.

8. The extended ratchet wrench as claimed in claim 7, wherein the outer threaded portion is formed on an outer peripheral surface of the protruding ring; an outer peripheral surface of the large-diameter portion has an annular groove; a C-shaped retaining ring fits into the annular groove; the hooking surface of the fixing ring hooks the C-shaped retaining ring along the second direction.

9. The extended ratchet wrench as claimed in claim 8, wherein two crimped surfaces are respectively provided on two opposite sides of an outer peripheral surface of the fixing ring.

10. The extended ratchet wrench as claimed in claim 6, wherein the first coupling member has an insertion hole that is in a non-circular shape; the second coupling member matches with the shape of the insertion hole; the second coupling member fits into the insertion hole along the second direction.

* * * * *